Jan. 9, 1945.   W. D. CANNON ET AL   2,366,830
FUEL PRIMING AND DEICING MEANS
Filed Oct. 6, 1942   2 Sheets-Sheet 1
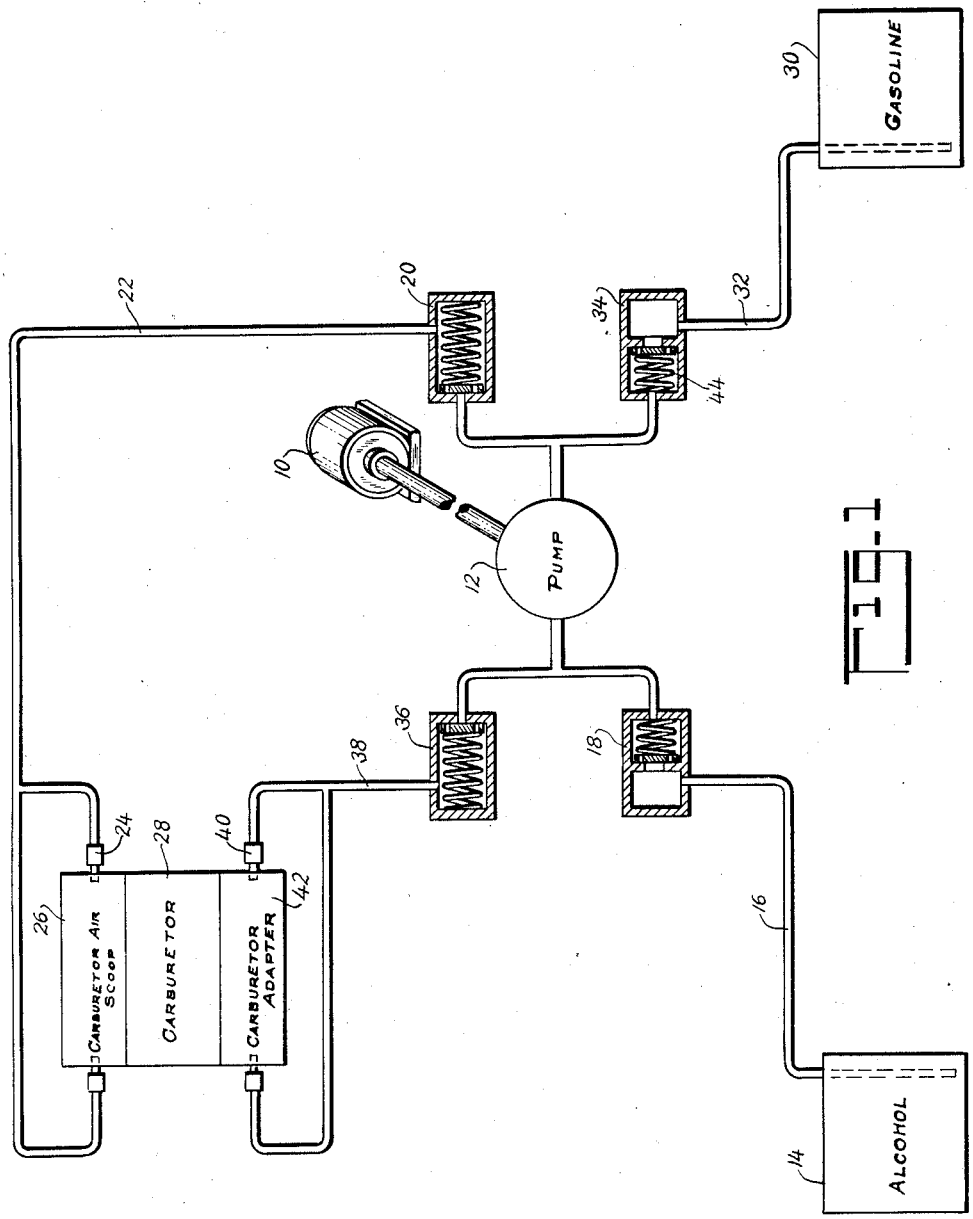
Wayne D. Cannon.
Kenneth A. Browne.
INVENTORS
BY
ATTORNEY

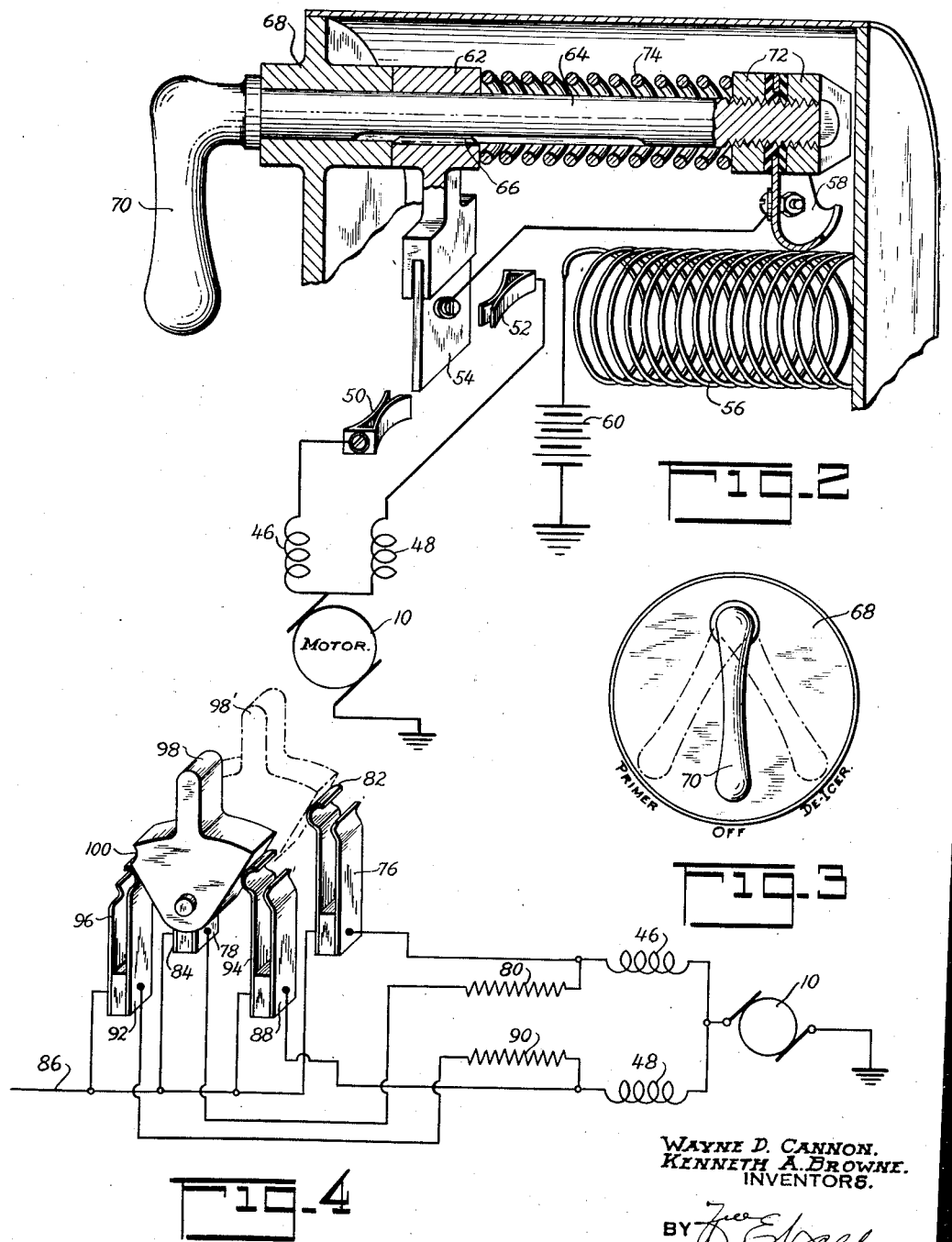

Patented Jan. 9, 1945

2,366,830

UNITED STATES PATENT OFFICE 2,366,830

FUEL PRIMING AND DEICING MEANS

Wayne D. Cannon, Hohokus, and Kenneth A. Browne, Ridgewood, N. J., assignors to Wright Aeronautical Corporation, a corporation of New York Application October 6, 1942, Serial No. 461,034

11 Claims. (Cl. 123—127)

This invention relates to a combination aircraft engine, fuel priming and de-icing means wherein a single pump is utilized for both the fuel priming and de-icing operations.

The provision of fuel priming means and separate de-icing means for aircraft engines is common practice. It is an object of this invention to provide a single reversible pump for operating both of these means, the direction of operation of the pump determining whether the pump is pumping fuel or de-icing fluid. In addition, it is an object of this invention to provide a system of automatic valves which eliminates the necessity of manual valving on the part of the operator to confine the flow path of the fuel and de-icing fluid. It is a further object of this invention to provide a single manual control handle operable to select the desired pump operation and also operable to control the spee of the pump. Specifically, in the preferred embodiment of this invention the control means for the pump comprises a control handle rotatable to control the direction of operation of the pump and axially shiftable to control the speed of the pump operation. Thus, when the pump is being used as a fuel primer, the axial movement of the handle is similar to the operation of a conventional engine choke.

Other objects of the invention will become apparent in reading the annexed detailed description in connection with the drawings, in which:

Fig. 1 is a schematic view of the combined fuel priming and de-icing system;

Fig. 2 is a view showing the control circuit and control switch;

Fig. 3 is an end view of the control handle; and

Fig. 4 illustrates a modified control circuit.

Referring to Fig. 1, a reversible electric motor 10 is drivably connected to a conventional reversible pump 12 which may be a rotary displacement type pump. Alcohol or other de-icing fluid is stored in a tank 14 and upon operation of the pump in one direction, this de-icing fluid is drawn through the line 16, check valve 18, and pumped through check valve 20, line 22, to the nozzles 24. These nozzles are adapted to spray the de-icing fluid into the airscoop 26 of the engine carburetor 28. Upon operation of the pump in the reverse direction, fuel is drawn from the fuel tank 30 through line 32, check valve 34, and pumped through check valve 36, line 38, to nozzles 40. These nozzles 40 are arranged to spray the fuel into a carburetor adapter 42 to thereby prime the combustible mixture of air and fuel.

Check valves 18, 20, 34 and 36 are all biased closed by springs 44, but the pump 12 develops sufficient pressure to open the appropriate check valves. When the pump is operating in the direction to feed de-icing fluid through line 16, check valves 18 and 20 and line 22, the check valve 34 automatically operates to prevent the flow of de-icing fluid into the fuel tank 30. In fact, when the pump is so operating, the pump pressure augments the spring pressure 44 to help keep the check valve 34 closed. Also, during the de-icing operation of the pump, check valve 36 prevents the pump from drawing combustible mixture instead of de-icing fluid. Conversely, when the pump is operating in the other direction to feed fuel through line 32, check valves 34 and 36, and line 38, the check valve 18 automatically prevents the pump from feeding fuel into the tank 14 containing the de-icing fluid. At the same time check valve 20 automatically prevents the pump from drawing air through line 22 instead of fuel from the tank 30. Accordingly, all that the operator needs to do is to control the direction of operation of the motor 10 and pump 12 while the check valves 18, 20, 34 and 36 automatically confine the de-icing fluid and the fuel to their respective flow paths.

Referring to Figs. 2 and 3, the reversible motor 10 is provided with field windings 46 and 48 to control the direction of operation of the motor. These windings 46 and 48 are connected to switch contacts 50 and 52, respectively. The cooperating switch blade 54 is adapted to close the motor circuit through either of these contacts and through an adjustable resistance 56. Contact blade 54 is connected with the resistance 56 through an arcuate contact 58 while the one end of this resistor is connected to a source of electric energy 60. Thus, when the switch blade 54 engages contact 50, a circuit is completed through the resistor 56 and winding 46 of the motor to rotate the motor in one direction, while when switch blade 54 engages contact 52 a circuit is completed through the resistor 56 to the winding 48 of the motor to cause rotation of the motor in the reverse direction. Switch blade 54 is mounted on a hub 62 slidably splined at 66 to a shaft 64. This shaft is journaled within a casing structure 68 and has a projecting handle 70. The contact 58 is mounted on the inner end of the shaft 64 by means of nuts 72. A spring 74 is provided to inwardly bias the shaft 64 and its handle 70. Thus, rotation of the handle 70 is imparted to the switch blade 54 through the spline connection 66. At this point, it should be noted that contact 58 has an arcuate contacting edge to insure contact with the resistor 56 in either rotative position of the handle. Also, in view of the slidable spline connection 66, the handle 70 may be withdrawn outwardly, in any rotative position of the handle, against the bias of spring 74 to gradually cut out the resistance 56. As illustrated in Fig. 3, the handle may be thrown to the left to initiate the fuel priming operation of the pump and then the handle may be drawn outwardly to cut out a part or all of the resistance 56 to increase the speed of operation of the motor and pump. Similarly, the handle may be thrown to the right to initiate the de-icing operation of the pump, and the handle may be pulled out to control the speed of the pump. From the above description, it is seen that the unitary control handle 70 is operable to control both the direction and speed of the pump operation.

An alternative switch and control circuit is illustrated in Fig. 4. Motor winding 45 is connected to switch contact 76 and through resistance 80 to a switch contact 78. Operating contacts 82 and 84 are connected to the line 86 which in turn is connected to a source of power, not shown. Similarly, motor winding 48 is connected directly to switch contact 88 and through a resistance 90 is connected to switch contact 92. Cooperating contacts 94 and 96 are also connected to the line 86. A switch operating handle 98 is rotatable and axially slidable to close any of the switch contacts. In its full line position, as illustrated in Fig. 4, the switch may be rotated to the right to close switch contacts 88 and 94 to complete a circuit directly to the motor winding 48. If the handle 98 is thrown to the left, switch contacts 92 and 96 are closed to complete a circuit to the motor winding 48 through resistance 90 thereby operating the motor at a slower speed but in the same direction as when contacts 88 and 94 are closed. The handle may be axially shifted to the position indicated at 98'. In this latter position, the handle may be deflected to the right to close switch contacts 76 and 82 to complete a circuit directly to the motor winding 46, or the handle may be deflected to the left to close a circuit to the motor winding 46 through resistance 80 and switch contacts 78 and 84. A notch 100 is provided in the left cam portion of the handle 98 so that the handle will be releasably locked in position when it is deflected to the left. Depending on the axial disposition of the handle, deflection of the handle to the left completes a circuit to the motor windings 46 or 48 through resistances 80 or 90 respectively, to operate the motor at a relatively low speed. Similarly, depending on the axial position of the handle, deflection of the handle to the right completes a circuit directly to the motor winding 46 or 48 which circuit by-passes resistances 80 and 90 to thereby operate the motor 10 at a high rate. Thus, deflection of the handle to the right provides for either emergency de-icing or for full fuel priming, depending on the axial position of the handle. In view of the inherent resiliency of the switch contact, it is necessary for the operator to hold the handle 98 in its righthand position as long as it is desired to operate the motor at this high rate. However, obviously, a notch similar to notch 100 may also be provided on the righthand face of the switch handle, if desired, and conversely, the notch 100 may be eliminated.

With either the control switch and circuit of Fig. 2 or that of Fig. 4, this invention provides a simple combined fuel priming and de-icing system in which both operations are performed by a single pump in response to operation of a single control member. That is, the invention provides for the use of a single pump to take the place of the two pumps heretofore used and in addition a single control lever is substituted for the two control levers previously necessary. The resulting saving in weight and simplification of the control are highly important factors in modern aircraft.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. A combination fuel priming and de-icing system for an aircraft engine installation comprising a source of fuel, a source of de-icing fluid, a pump operative to supply either de-icing fluid or priming fuel, and means for selecting either of said pump operations.

2. In combination with an engine, a source of fuel for priming the engine, a source of de-icing fluid, and a pump operable to supply either fuel to prime said engine or de-icing fluid, to said engine.

3. In combination with an internal combustion engine having an induction system, a source of fuel, a source of de-icing fluid, and a pump, said pump being operable either to supply de-icing fluid to one point of the engine induction system or to supply priming fuel to another point of the engine induction system.

4. In combination with an engine, a system for feeding one or the other of two fluids to said engine according to the demands thereof under different engine operating conditions, said system comprising a first source of fluid, a second source of fluid, and a reversible pump, said pump being operable in one direction to supply one of said fluids to said engine and being operable in the other direction to supply the other of said fluids to said engine.

5. In combination with an engine, a source of fuel for priming the engine, a source of de-icing fluid, and a reversible pump operable in one direction to supply priming fuel to the engine and operable in the other direction to supply de-icing fluid to said engine.

6. In combination with an engine, a source of fuel for priming the engine, a source of de-icing fluid, a reversible pump operable in one direction to supply priming fuel to the engine and operable in the other direction to supply de-icing fluid to said engine, and a unitary control member operable to control both the direction and speed of said pump.

7. In combination with an engine, a source of fuel for priming the engine, a source of de-icing fluid, a reversible pump operable in one direction to supply priming fuel to the engine and operable in the other direction to supply de-icing fluid to said engine, and a unitary control member operable to control both the direction and speed of said pump, said control member being rotatable to control the direction of pump operation and being axially shiftable to control the speed of pump operation.

8. In combination with an engine, a source of fuel for priming the engine, a source of de-icing fluid for said engine, and a reversible pump operable in one direction to supply priming fuel to said engine and operable in the other direction to supply de-icing fluid to said engine, and a control member for said pump, said control member having four positions in two of which said pump operates in one direction at a speed determined by the particular position selected, and in the other two positions said pump operates in the other direction at a speed determined by the particular positions selected.

9. In combination with an engine, a source of fuel, a source of de-icing fluid, a reversible pump, fluid flow passages between said pump and said source of fuel, said source of de-icing fluid and said engine, check valve means in said passages arranged to provide for fuel flow from said source of fuel to said engine upon pump operation in one direction and arranged to provide for flow of de-icing fluid from said source of de-icing fluid to said engine upon pump operation in the other direction, and means to control the direction of operation of said pump.

10. In combination with an engine, a source of fuel, a fuel priming nozzle, a source of de-icing fluid, a de-icing fluid discharge nozzle, a reversible pump, fluid flow passage connections from said fuel source to said pump and thence to said fuel priming nozzle, fluid flow passage connections from said source of de-icing fluid to said pump and thence to said de-icing nozzle, said connections including check valve means so arranged that upon pump operation in one direction fuel is pumped into said engine through said priming nozzle and upon pump operation in the reverse direction de-icing fluid is pumped into said engine through said de-icing nozzles.

11. In combination with an engine, a source of fuel, a fuel priming nozzle for said engine, a source of de-icing fluid, a de-icing fluid discharge nozzle for said engine, a reversible fluid pump having first and second fluid connections, said pump being adapted to cause fluid to flow either from said first fluid connection to said second fluid connection or vice versa depending on the direction of operation of said pump, a conduit connecting said source of fuel with said first pump connection, a conduit connecting said de-icing nozzle with said first pump connection, a conduit connecting said source of de-icing fluid with said second pump connection, a conduit connecting said priming nozzle with said second pump connection, check valve means in the conduits connecting the source of fuel and source of de-icing fluid with said pump and arranged to prevent flow from said pump into said conduits, check valves in the other conduits and arranged to prevent flow therefrom to the pump, and means to control the direction of operation of the pump.

WAYNE D. CANNON.
KENNETH A. BROWNE.